US007885754B2

(12) United States Patent
Topinka et al.

(10) Patent No.: US 7,885,754 B2

(45) Date of Patent: Feb. 8, 2011

(54) FUEL INJECTION SYSTEM AND METHOD OF OPERATING THE SAME FOR AN ENGINE

(75) Inventors: Jennifer Ann Topinka, Niskayuna, NY (US); James Peter DeLancey, Corinth, NY (US); Roy James Primus, Niskayuna, NY (US); Florian Peter Pintgen, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 592 days.

(21) Appl. No.: 11/952,720

(22) Filed: Dec. 7, 2007

(65) Prior Publication Data

US 2009/0150044 A1 Jun. 11, 2009

(51) Int. Cl.
*F02D 41/30* (2006.01)
*G06F 19/00* (2006.01)

(52) U.S. Cl. ........................ 701/104; 701/103; 123/299

(58) Field of Classification Search ......... 701/101–105, 701/115; 123/299, 300, 478, 458, 446; 239/553.4
See application file for complete search history.

(56) References Cited

U.S. PATENT DOCUMENTS

| | | | | |
|---|---|---|---|---|
| 4,336,782 | A * | 6/1982 | Endo et al. | 123/478 |
| 4,633,842 | A | 1/1987 | Ikeda et al. | |
| 6,082,331 | A * | 7/2000 | Barnes et al. | 123/446 |
| 6,286,480 | B1 | 9/2001 | Chen et al. | |
| 6,295,816 | B1 | 10/2001 | Gallagher et al. | |
| 6,302,080 | B1 | 10/2001 | Kato et al. | |
| 6,382,177 | B1 | 5/2002 | Saito | |
| 6,470,849 | B1 | 10/2002 | Duffy et al. | |
| 6,557,347 | B1 | 5/2003 | Alvarez et al. | |
| 6,684,853 | B1 * | 2/2004 | Lei | 123/300 |
| 6,910,458 | B2 * | 6/2005 | Oki | 123/198 F |
| 6,990,951 | B1 * | 1/2006 | Liu et al. | 123/299 |

FOREIGN PATENT DOCUMENTS

| | | | |
|---|---|---|---|
| DE | 19636088 | A1 | 3/1998 |
| DE | 19930530 | A1 | 1/2001 |
| DE | 10014553 | A1 | 10/2001 |
| FR | 2 908 462 | A1 * | 5/2008 |
| WO | 0123741 | A1 | 4/2001 |

OTHER PUBLICATIONS

PCT International Search Report, dated Mar. 17, 2009.

* cited by examiner

*Primary Examiner*—Hieu T Vo
(74) *Attorney, Agent, or Firm*—Fletcher Yoder

(57) ABSTRACT

A fuel injector is coupled to an engine. The fuel injector includes an injection opening configured to vary in cross-section between a open state and a fully closed state. The fuel injector is configured to provide a plurality of discrete commanded fuel injections into an engine cylinder by modulating the size of the injection opening without completely closing the opening to the fully closed state.

25 Claims, 8 Drawing Sheets

FUEL INJECTION SYSTEM AND METHOD OF OPERATING THE SAME FOR AN ENGINE

STATEMENT REGARDING FEDERALLY SPONSORED RESEARCH AND DEVELOPMENT

This invention was made with Government support under contract number DE-FC04-2002AL68284 awarded by Department of Energy. The Government has certain rights in the invention.

BACKGROUND

The invention relates generally to a fuel injection system and method and, more specifically, to a system and method for operating a fuel injection system to reduce specific fuel consumption, engine exhaust emission, and fuel injector wear in an engine, e.g. turbocharged diesel engine.

In a compression-ignition engine, such as a diesel engine, a fuel injection system injects fuel (e.g., diesel fuel) into compressed air within each of the engine cylinders to create an air-fuel mixture that ignites due to the heat and pressure of compression. Engine efficiency, power output, fuel consumption, exhaust emissions, and other operational characteristics are trade-offs. Conventional techniques to improve one operational characteristic often worsen one or more other operational characteristics. For example, attempts to decrease specific fuel consumption often cause increases in various exhaust emissions characteristics. Vehicle exhaust emissions include pollutants such as carbon monoxide, nitrogen oxides (NOx), particulate matter (PM), and smoke generated due to incomplete combustion of fuel within the combustion chamber. The amount of these pollutants varies depending on the fuel-air mixture, compression ratio, injection timing, ambient conditions, and so forth.

Fuel injection systems generally employ fuel injectors, which open and fully close a valve for each commanded injection of fuel. Each injection of fuel causes wear on the valve due to the physical contact made between parts of the valve. Eventually, this wear can reduce performance and require servicing and/or replacement of the fuel injector. For example, significant wear can cause fuel leakage, undesirable changes in the fuel injection profile and so forth. In turn, this can result in a poor fuel-air mixture, which causes increased exhaust emissions.

BRIEF DESCRIPTION

In accordance with one exemplary embodiment of the present technique, a method includes providing a modulated fuel injection in an engine cylinder, without completely closing a valve of a fuel injector, by commanding a plurality of discrete fuel injections to the fuel injector.

In accordance with another exemplary embodiment of the present technique, a tangible medium including a computer program is disclosed. The tangible medium includes programming instructions disposed on the tangible medium. The programming instructions include instructions to provide a plurality of fuel injections into an engine cylinder via a fuel injector. The programming instructions also include instructions to actuate a fuel injection valve of the fuel injector between a fully closed, an open position and a partially closed position during each fuel injection into the engine cylinder.

In accordance with another exemplary embodiment of the present technique, a system includes a controller configured to control a fuel injector to provide a plurality of fuel injections into an engine cylinder. The controller is configured to actuate a fuel injection valve of the fuel injector between a fully closed, an open position and a partially closed position during each fuel injection into the engine cylinder.

In accordance with another exemplary embodiment of the present technique, a fuel injector configured to provide a plurality of fuel injections into an engine cylinder is disclosed. The fuel injector includes a fuel injection valve disposed in a fuel injection housing. A controller is coupled to the fuel injection valve and configured to actuate the fuel injection valve between a fully closed, an open position and a partially closed position during each fuel injection into the engine cylinder.

In accordance with another exemplary embodiment of the present technique, a vehicle is disclosed. The vehicle includes an engine having a piston disposed inside a cylinder. A fuel injector is coupled to the engine. The fuel injector includes an injection opening configured to vary in cross-section between a fully open state and a fully closed state. The fuel injector is configured to receive a plurality of discrete fuel injection commands, which result in a modulation of an injection valve opening and delivery of fuel into the cylinder without necessarily completely closing the valve.

DRAWINGS

These and other features, aspects, and advantages of the present invention will become better understood when the following detailed description is read with reference to the accompanying drawings in which like characters represent like parts throughout the drawings, wherein.

Figure 8:
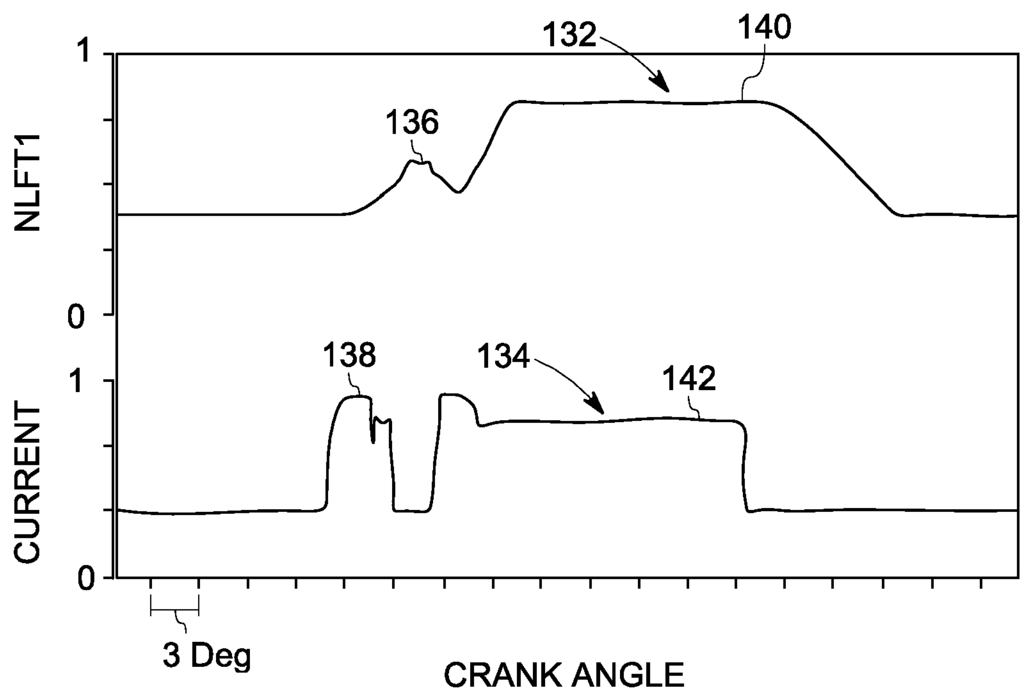
Figure 9:
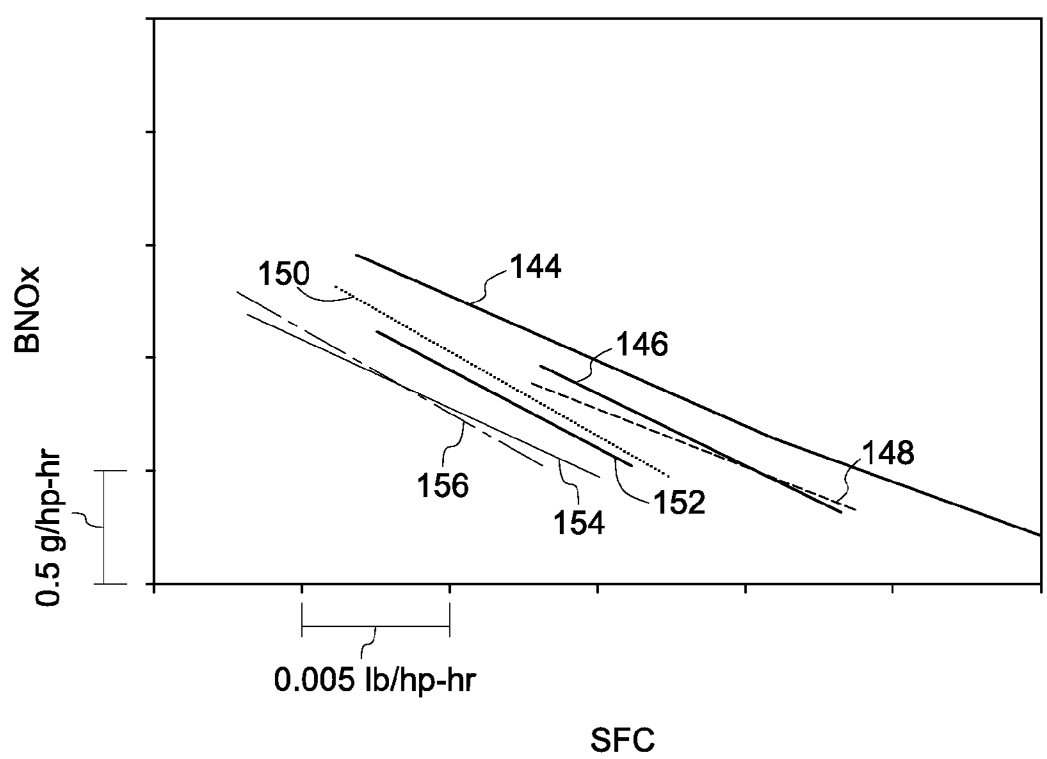

FIG. 8 is a graph illustrating variation of current and valve lift with respect to crank angle of a compression-ignition engine in accordance with an exemplary embodiment of the present technique; and FIG. 9 is a graph illustrating relative variation of brake NOx emission with respect to specific fuel consumption of a compression-ignition engine employing multiple fuel injection strategy in accordance with an exemplary embodiment of the present technique.

DETAILED DESCRIPTION

As discussed in detail below, some embodiments of the present invention disclose a technique for providing a plurality of discrete commanded fuel injections into an engine cylinder by modulating a valve of a fuel injector without completely closing the valve so as to reduce injector wear. In other words, physical contact is not made at the interface of the valve during these discrete fuel injections. For example, the interface may correspond to a needle valve and its seat. Furthermore, the plurality of discrete commanded fuel injections may correspond to each cylinder, such that the discrete fuel injections are part of a multiple injection scheme. These discrete fuel injections may be of equal quantity or different quantities. For example, the discrete fuel injections may include one or more pilot fuel quantities (e.g., less than 5 percent of total) followed by one or more main fuel quantities. Other examples include post injection and so-called split injection, in which the multiple injection quantities are split in approximately equal parts. By further example, the total fuel quantity for injection into a cylinder during a compression stroke may be divided into 2, 3, 4, 5, 6, 7, 8, 9, 10, or more quantities of fuel in the plurality of discrete fuel injections. In certain other exemplary embodiments, a fuel injector having a controller configured to control a fuel injector to provide a plurality of fuel injections into an engine cylinder is disclosed. The controller is configured to actuate a fuel injection valve of the fuel injector between a fully closed, an open position and a partially closed position during each fuel injection into the engine cylinder. In other words, the exemplary fuel injection strategy involves a plurality of discrete commanded fuel injections in which the fuel injector valve does not fully close between the injection events (may be referred to as "non-seating injections"). The exemplary fuel injection technique facilitates modulated injection rate for enhanced engine performance, and reduced injector wear.

Figure 1:
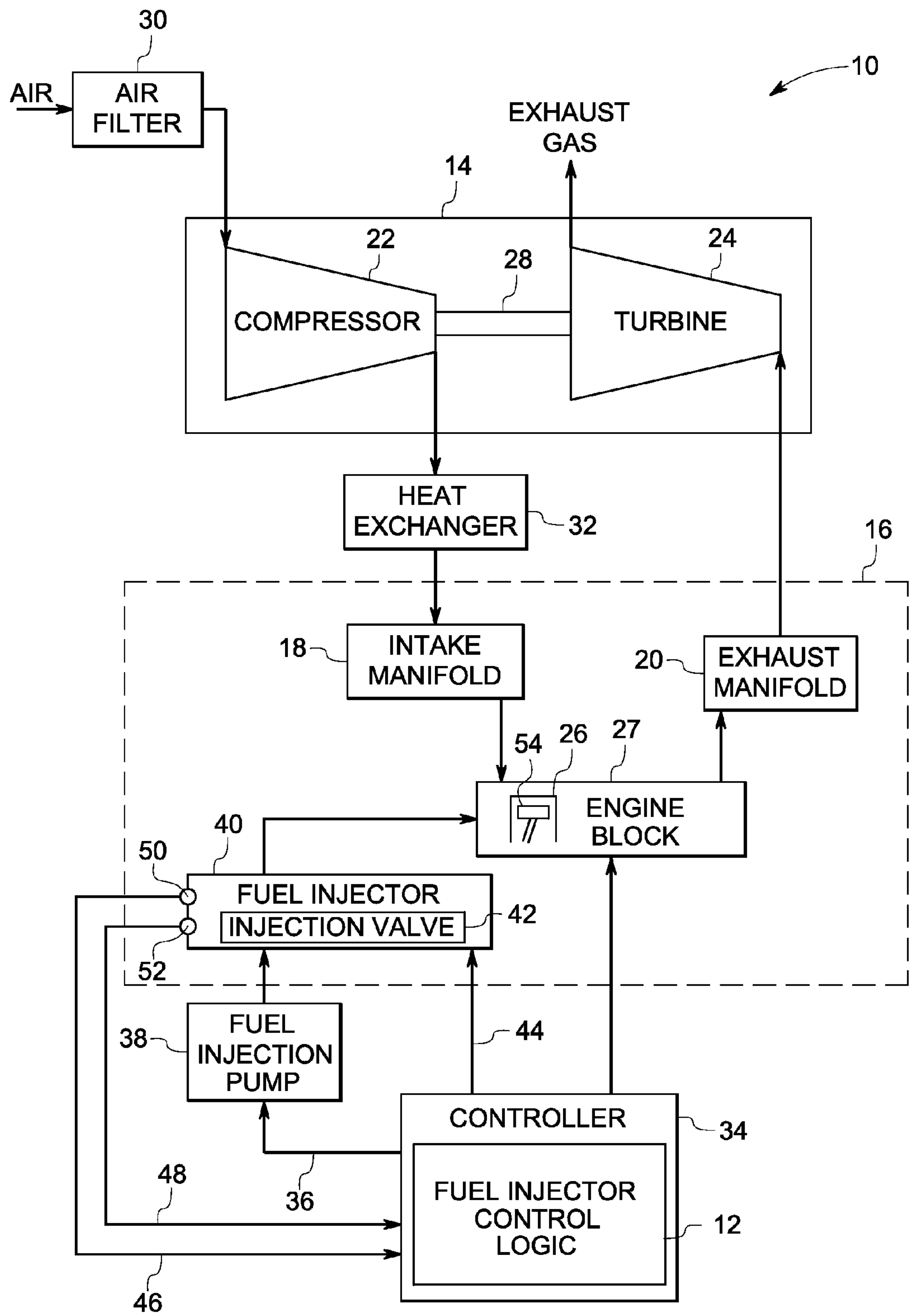
FIG. 1 is a diagrammatical representation of a turbocharged engine having fuel injection control features in accordance with an exemplary embodiment of the present technique.

Referring to FIG. 1, a turbocharged system 10 having fuel injector control logic 12 is illustrated in accordance with certain embodiments of the present technique. In the illustrated embodiment, the turbocharged system 10 may include a vehicle power unit, e.g., an automobile engine or a locomotive power unit. The locomotive power unit 10 includes a turbocharger 14 and a compression-ignition engine, e.g. diesel engine 16. In certain embodiments, the turbocharger 14 is optional. As discussed in further detail below, embodiments of the present technique provide monitoring and control features, such as sensors and control logic, to control fuel injector wear, engine exhaust emissions and specific fuel consumption (SFC) within the locomotive power unit 10. For example, the injector wear, engine exhaust emissions, and the specific fuel consumption are reduced by splitting fuel injection of a predetermined quantity into two or more fuel injections (e.g., one or more pilot fuel injections and a main fuel injection) without completely closing a fuel injector valve. It should be noted herein that fuel injection timings may vary depending upon the application. As described in the previous paragraph, the exemplary fuel injection strategy involves providing a plurality of non-seating discrete fuel injections. In one example, the injection operation includes splitting the fuel injection into two or more "non-seating" pilot fuel injections and the main fuel injection, and providing substantially larger fuel quantity in the main injection event than the two or more pilot fuel injections.

The illustrated engine 16 includes an air intake manifold 18 and an exhaust manifold 20. The turbocharger 14 includes a compressor 22 and a turbine 24 and is operated to supply compressed air to the intake manifold 18 for combustion within a cylinder 26 of an engine block 27. In various embodiments, the engine block 27 may include 1, 2, 3, 4, 5, 6, 7, 8, 9, 10, 11, 12, or more cylinders 26. However, the engine block 27 will typically have an even number of cylinders 26, e.g., 4, 6, 8, 10, 12, or 16. The turbine 24 is coupled to the exhaust manifold 20. The exhaust gases ejected from the exhaust manifold 20 are expanded through the turbine 24, thereby forcing rotation of a turbocharger shaft 28 connected to the compressor 22. The compressor 22 draws in ambient air through an air filter 30 and provides compressed air to a heat exchanger 32. The temperature of air is increased due to compression through the compressor 22. The compressed air flows through the heat exchanger 32 such that the temperature of air is reduced prior to delivery into the intake manifold 18 of the engine 16. In one embodiment, the heat exchanger 32 is an air-to-water heat exchanger, which utilizes a coolant to facilitate removal of heat from the compressed air. In another embodiment, the heat exchanger 32 is an air-to-air heat exchanger, which utilizes ambient air to facilitate removal of heat from compressed air. In yet another embodiment, the heat exchanger 32 utilizes a combination of a coolant and ambient air to facilitate removal of heat from compressed air.

The power unit 10 also includes a controller 34. In one embodiment, the controller 34 is an electronic logic controller that is programmable by a user. In another embodiment, the controller 34 is an electronic fuel injector controller for the engine 16. The controller 34 may be operable to produce a pressure signal 36 to control operation of a plurality of fuel injection pumps 38. The pumps 38 drive a plurality of fuel injectors 40 for injecting fuel into the plurality of cylinders 26 of the engine 16. The fuel injector 40 includes a fuel injection valve 42. In the illustrated embodiment, the fuel injector 40 is an electrically actuated fuel injector. The fuel injector 40 typically injects fuel into the engine cylinder 26 as a function of a fuel injection signal 44 received from the controller 34. The fuel injection signal 44 may include waveforms that are indicative of a desired amount of opening and closing of the fuel injection valve 42, fuel injection rate, desired fuel injection timing, quantity of fuel to be injected into the cylinder 26, or the like. In the illustrated embodiment, the controller 34 is configured to receive a fuel pressure signal 46 and position signal 48 from a pressure sensor 50 and a position sensor 52 respectively. The pressure sensor 50 is configured to detect fuel pressure in the fuel injector 40 and the position sensor 52 is configured to detect the position of the fuel injection valve 42. A piston 54 is slidably disposed in each cylinder 26 and reciprocates between a top dead center (TDC) and a bottom dead center (BDC) position. The controller 34 is configured to produce the fuel injection signal 44 to control the operation of plurality of fuel injectors 40 based on the fuel pressure signal 46 and/or position signal 48 from the pressure sensor 50 and the position sensor 52 respectively. In certain embodiments, the position sensor 52 may not be required. The operation of the fuel injector is explained in greater detail with reference to subsequent figures below.

Figure 2:
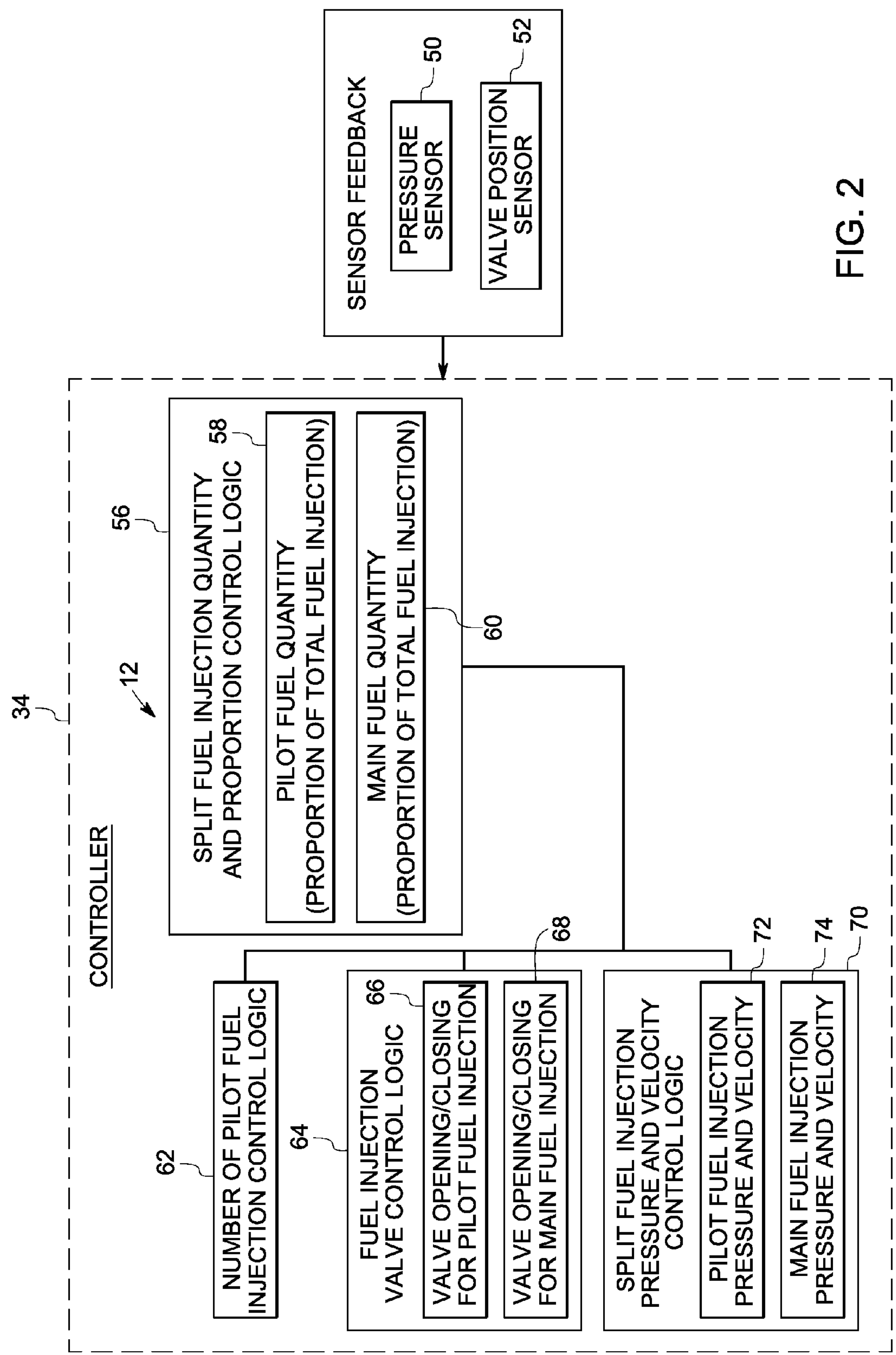
FIG. 2 is a diagrammatical representation of fuel injection control logic features in accordance with an exemplary embodiment of the present technique.

Referring to FIG. 2, the controller 34 having fuel injector control logic 12 is illustrated in accordance with embodiments of the present technique. As illustrated, the controller 34 receives the fuel pressure signal 46 and position signal 48 from the pressure sensor 50 and the position sensor 52 respectively. As discussed previously, the pressure sensor 50 is configured to detect fuel pressure in the fuel injector 40 and the position sensor 52 is configured to detect position of the fuel injection valve 42. The controller 34 includes a split fuel injection quantity and proportion control logic 56 that enables the controller 34 to provide a plurality of discrete commanded fuel injections into the engine cylinder 26 by modulating (without fully closing) the fuel injection valve 42 of the fuel injector 40. In the illustrated embodiment, the logic 56 enables the controller 34 to provide one or more multiple fuel injection quantities 58 and a main fuel injection quantity 60 as the piston 54 approaches the top dead center of in the engine cylinder 26. For example, pilot fuel injection quantities in the range of 1 to 5% of total fuel injection quantity may be injected into the engine cylinder 26 before the top dead center of the compression stroke. In one embodiment, two or more generally equal quantity pilot fuel injections may be provided in the engine cylinder 26 as a piston 54 approaches top dead center in the engine cylinder 26. In another embodiment, two or more pilot fuel injections of unequal quantities may be provided in the engine cylinder 26. The split fuel injection quantity and proportion control logic 56 also enables the controller 32 to inject a main fuel injection quantity 60 into the engine cylinder 26 after the pilot injections when the piston 54 is in the vicinity of the top dead center position of the compression stroke. For example, main fuel injection quantity in the range of 95 to 99% of the total fuel injection quantity may be injected into the engine cylinder 26 when the piston position is in vicinity of the top dead center of the compression stroke. In another embodiment, multiple fuel injections may be provided after the main fuel injection.

The controller 34 also includes a number of pilot fuel injection control logic 62 that enables the controller 34 to determine the number of pilot injections among the plurality of discrete fuel injections. In one embodiment, the logic 62 enables the controller 34 to provide one or more pilot fuel injections in the engine cylinder 26. In another embodiment, the logic 62 enables the controller 34 to provide two or more pilot fuel injections in the engine cylinder 26.

The controller 34 also includes a fuel injection valve control logic 64 that enables the controller 34 to modulate the opening/closing of the fuel injection valve 42 of the fuel injector 40 based on the sensor signals 46, 48 from the pressure sensor 50 and the valve position sensor 52. In the illustrated embodiment, the opening/closing of the fuel injection valve 42 is varied to inject fuel for each of the plurality of discrete fuel injections. The opening and closing of the fuel injection valve 42 is modulated for pilot fuel injections 66 and the mail fuel injection 68. In one embodiment, the controller 34 modulates the fuel injection valve 42 such that the fuel injector valve 42 does not fully seat between the pilot injection events. In other words, during pilot fuel injections, the fuel injection valve 42 is actuated at a first time to open the valve 42 to inject a first pilot fuel quantity. The valve 42 is then moved from an open position towards a closed position. The valve 42 is then actuated a second time to inject a second pilot fuel quantity before the fuel injection valve 42 reaches the closed position. This non-seating injection technique is applicable for any number of pilot and main fuel injections. The exemplary non-seating (e.g., pilot) fuel injection technique reduces wear on the fuel injector tip as well as minimizes fuel pressure pulsations in the fuel injector 40 that are caused by the full opening and closing of the fuel injection valve 42.

In the illustrated embodiment, the controller 34 further includes a split fuel injection pressure and velocity control logic 70 that enables the controller 34 to adjust fuel injection pressure and velocity by modulating the fuel injection valve 42 during each fuel injection without completely closing the valve 42. In one example, the controller 34 adjusts the fuel pressure and velocity by actuating the fuel injection valve 42 between a fully closed, an open position and a partially closed position during each fuel injection into the engine cylinder 26. The non-seating injection strategy is employed for controlling pressure and velocity of pilot injection 72 and main injection 74. In the fuel injector 40, the velocity of the fuel exiting the injector 40 is a function of the fuel pressure in the injector 40. When the fuel injection valve 42 begins to close, the fuel pressure in the injector 40 is decreased, thereby reducing the velocity of the fuel exiting the injector 40. The exemplary non-seating (e.g., pilot) injection technique enhances air-fuel mixing in the engine cylinder 26, leading to enhanced homogenous combustion and lower exhaust emissions.

Figure 3:
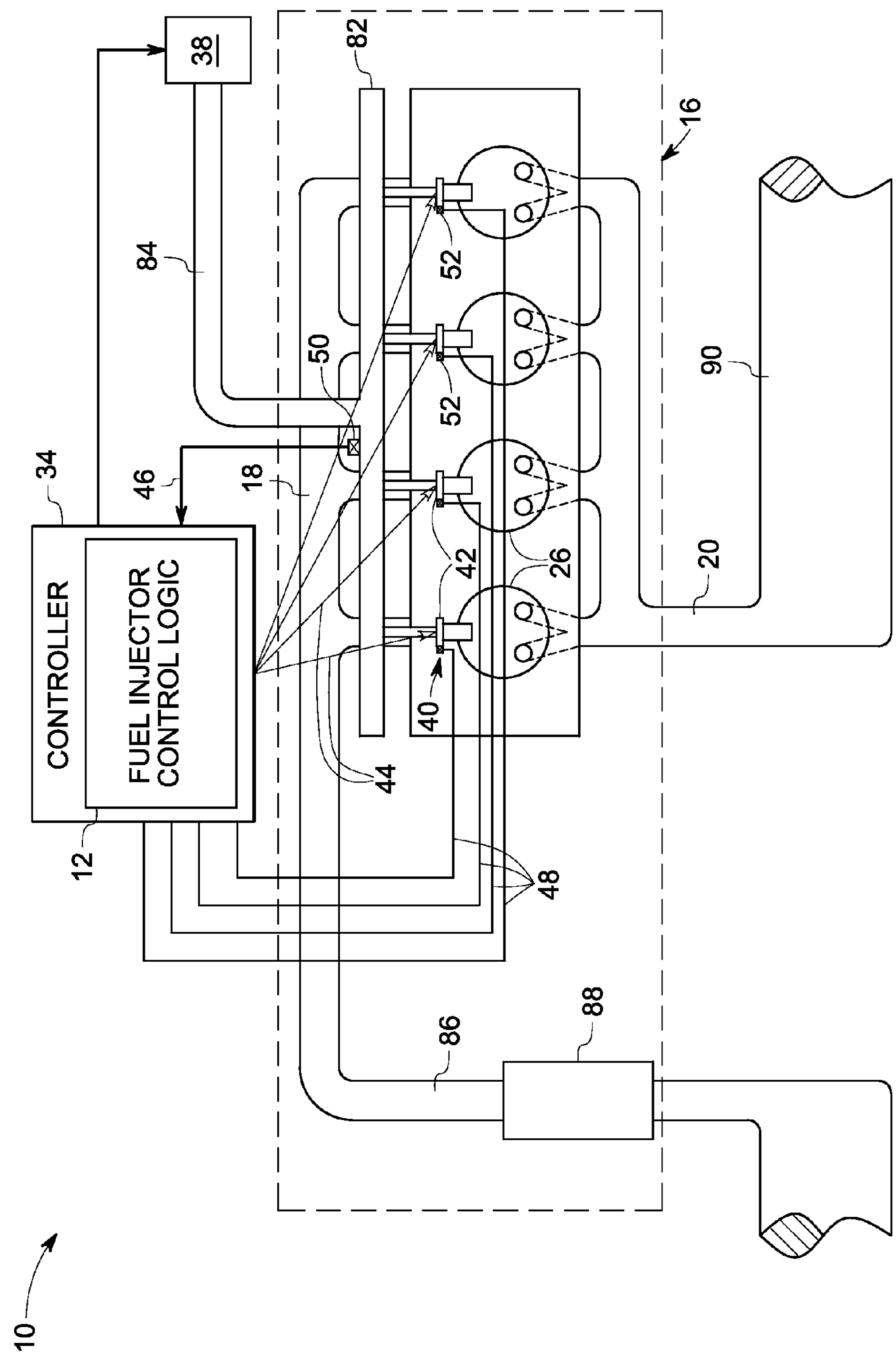
FIG. 3 is a diagrammatical representation of a multi-cylinder internal combustion engine having fuel injection control features in accordance with an exemplary embodiment of the present technique.

Referring to FIG. 3, the locomotive power unit 10 having a multi-cylinder arrangement of the engine 16 is illustrated in accordance with certain embodiments of the present technique. The fuel injectors 40 each include the fuel injection valve 42 disposed in fluid communication with a respective cylinder 26. In the illustrated embodiment, the engine 16 includes four cylinders 26 and four fuel injection valves 42, respectively. However, other numbers (e.g., 6, 8, 10, 12, 16, etc.) and configurations of cylinders 26 and fuel injection valves 42 are within the scope of the present technique. The fuel injection valves 42 are provided to inject fuel into a combustion chamber of each cylinder 26. The fuel injection valves 42 are coupled to a high pressure common rail 82 configured to pressurize the fuel to a preselected pressure. The high pressure common rail 82 is coupled to the fuel injection pump 38 via a fuel supply pipe 84. The common rail 82 is provided with the pressure sensor 50 for detecting a fuel pressure in the common rail 82 and transmitting the pressure signal 46 corresponding to the detected fuel pressure to the controller 34. The fuel pressure in the common rail 82 is maintained at a predetermined value depending on the operating condition of the engine 16 by actuating the fuel injection pump 38. Each of the fuel injection valves 42 is provided with the position sensor 52 configured to detect the position of fuel injection valve 42. In certain embodiments, the controller 34 is configured to produce the fuel injection signal 44 to control the operation of plurality of fuel injectors 40 based on the pressure signal 46 and the position signal 48 from the pressure sensor 50 and position sensor 52. In other embodiments, the power unit 10 may have a plurality of common rails 82 and fuel injection pumps 38.

The intake manifold 18 is coupled to the combustion chambers of the respective cylinders 26. The intake manifold 18 is coupled to an intake pipe 86. A heat exchanger 88 may be provided in the intake pipe 86 to cool the intake air through the intake pipe 86. The exhaust manifold 20 is coupled to the combustion chambers of respective cylinders 26 and to an exhaust pipe 90.

As discussed above, in the illustrated embodiment, the controller 34 is configured to control the number of injections, split fuel injection quantity, amount of opening/closing of the fuel injection valve, split fuel injection pressure and velocity, and split fuel injection rate based on the output from the sensors 50, 52. The usage of high pressure common rail 82 along with electrically actuated fuel injector enables the controller 34 to provide flexibility in number of injections, split fuel injection quantity, opening/closing of the fuel injection valve, split fuel injection pressure and velocity, split fuel injection rate.

In certain embodiments, compression ignition engines using common rail systems employ a plurality of discrete commanded fuel injections in the engine cylinder 26 per cycle. In accordance with the exemplary embodiments disclosed herein, using the non-seating fuel injection technique, the fuel injection valve 42 does not fully close during each injection, preventing accelerated wearing of fuel injector valve 42, injector 40, or a combination thereof. As a result, the non-seating fuel injection technique enables longer life of the fuel injector valves 42 with the advantages of multiple fuel injections, e.g., two or more fuel injections per cylinder per compression stroke.

Figure 4:
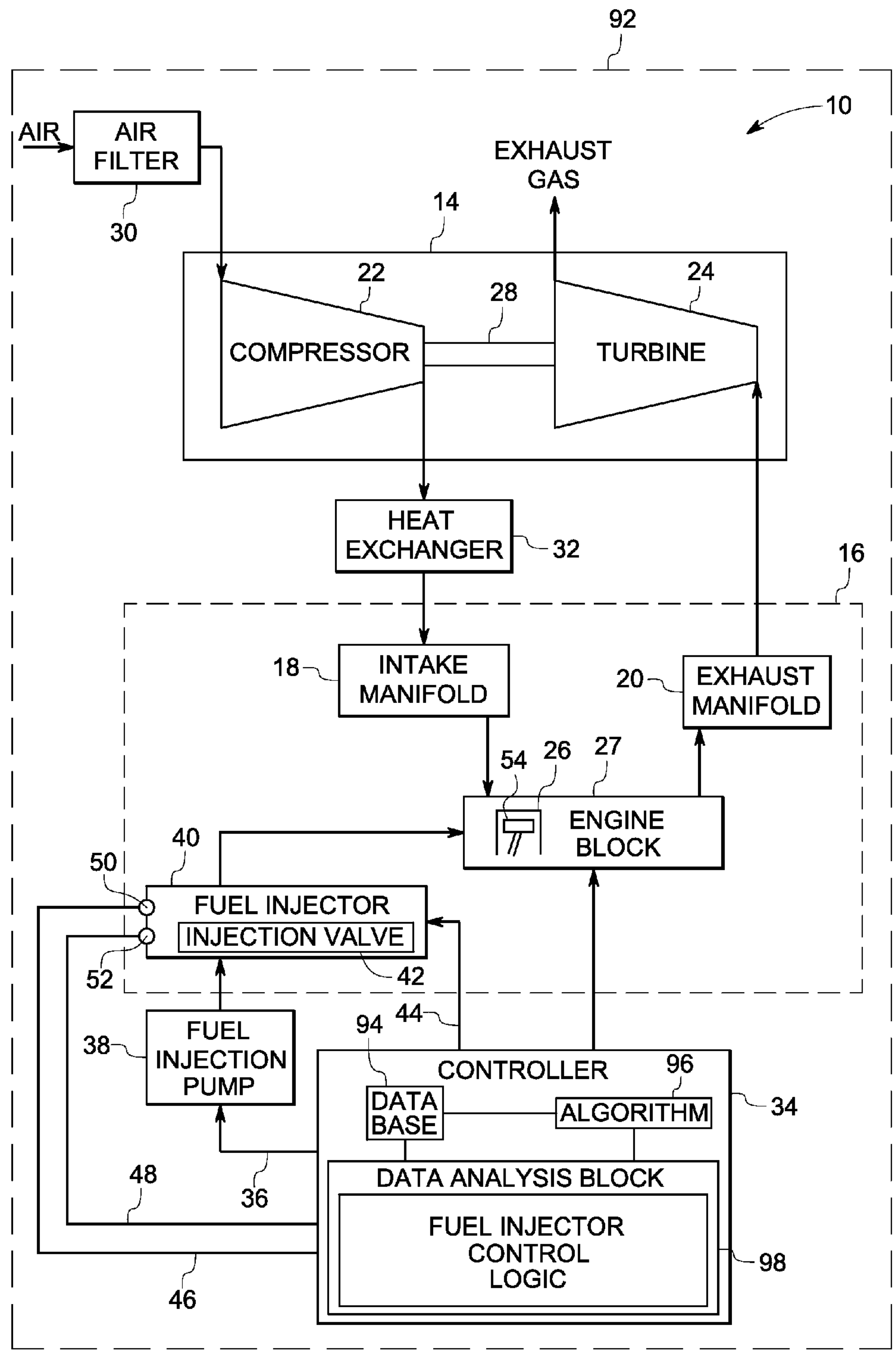
FIG. 4 is a diagrammatical representation of a system incorporating a turbocharged engine, such as a vehicle, having fuel injection control features in accordance with an exemplary embodiment of the present technique.

Referring to FIG. 4, one embodiment of the locomotive power unit 10 is illustrated. As illustrated above, the power unit 10 includes the turbocharger 14 and the compression-ignition engine 16. The power unit 10 may be used for driving a system 92. The system 92 may include high altitude locomotive, an automobile, a watercraft or other marine system, an aircraft, or the like. Alternatively, system 92 may include an electrical generator, an automation system, or another suitable system employing the power unit 10. The power unit 10 includes the controller 34. As illustrated, the controller 34 receives the fuel pressure signal 46 and position signal 48 from the pressure sensor 50 and the position sensor 52 respectively.

In the illustrated embodiment, the controller 34 may further include a database 94, an algorithm 96, and a data analysis block 98. The database 94 may be configured to store predefined information about the power unit 10. For example, the database 94 may store information relating to number of injections, fuel injection rate, fuel injection pressure and velocity, length of injection, injection quantity, maximum lift or opening of the valve, or the like. The database 94 may also include instruction sets, maps, lookup tables, variables, or the like. Such maps, lookup tables, instruction sets, are operative to correlate characteristics of the opening/closing of the fuel injection valve 42 to specified injections parameters such as number of injections, fuel injection rate, fuel injection pressure and velocity, length of injection, injection quantity, maximum lift or opening of the valve 42, or the like. Furthermore, the database 94 may be configured to store actual sensed/detected information from the above-mentioned sensors 50, 52. The algorithm 96 facilitates the processing of signals from the above-mentioned plurality of sensors 50, 52.

The data analysis block 98 may include a variety of circuitry types, such as a microprocessor, a programmable logic controller, a logic module, etc. The data analysis block 98 in combination with the algorithm 96 may be used to perform the various computational operations relating to determination of fuel injection rate, number of fuel injections, the fuel injection quantity, pressure and velocity of injection, amount of opening/closing of fuel injection valve, electrical current of the injector waveform, or a combination thereof. Any of the above mentioned parameters may be selectively and/or dynamically adapted or altered relative to time. The controller 34 is configured to reduce injector wear and control the engine exhaust emission and the specific fuel consumption by actuating the fuel injection valve 42 of the fuel injector 40 between a fully closed, an open position and a partially closed position during each fuel injection into the engine cylinder 26.

Figure 5:
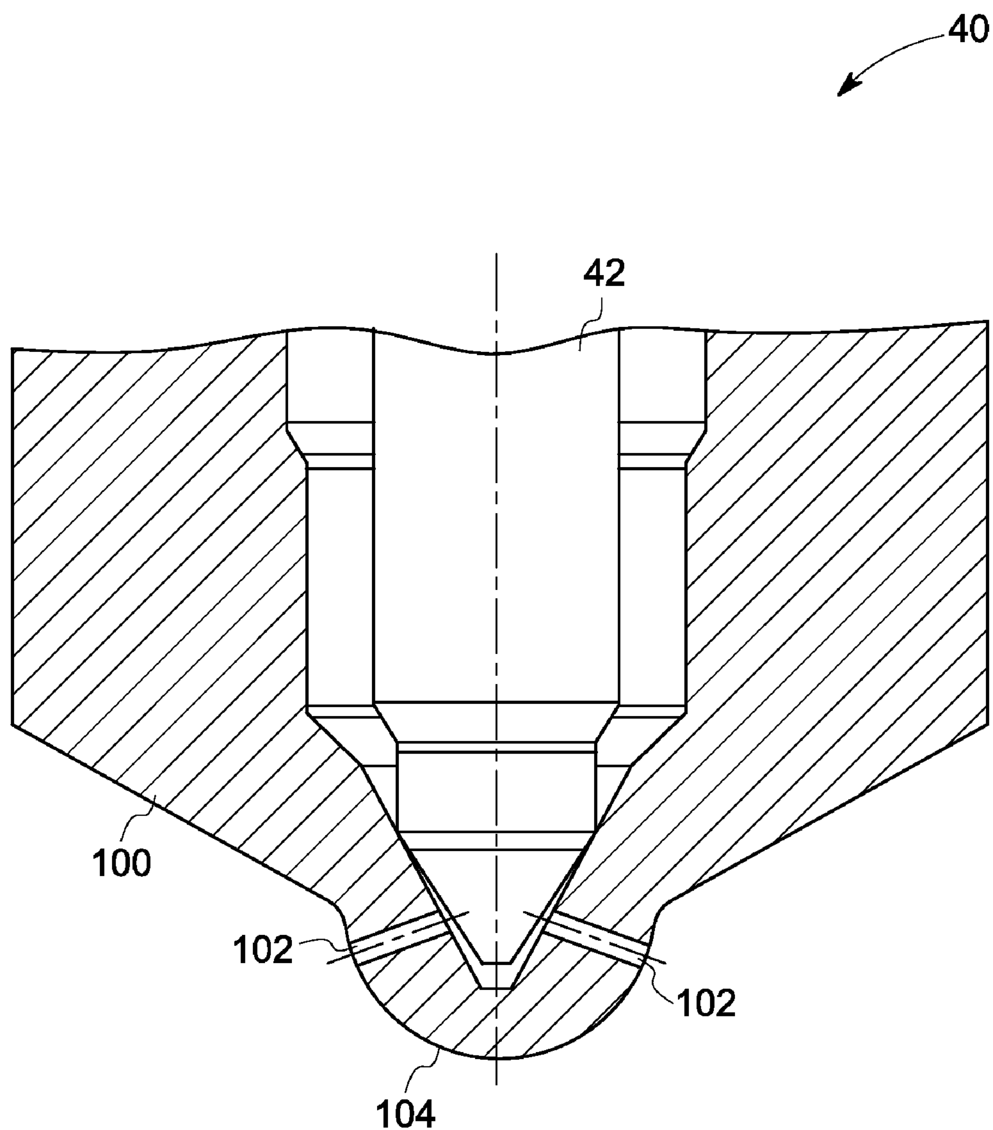
FIG. 5 is a cross-sectional view of a fuel injector in accordance with an exemplary embodiment of the present technique.

Referring to FIG. 5, one embodiment of the fuel injector 40 is illustrated. The illustrated fuel injector 40 includes the fuel injection valve 42 e.g. needle valve disposed in a fuel injection housing 100. The housing 100 includes a plurality of fuel injection holes 102 provided in a nozzle tip 104. The number of injection holes 102 and spacing between the holes may vary depending on the application. The injector 40 may be either electronically or electrically actuated injector. The fuel injection pump 38 is configured to supply pressurized fuel to the fuel injector 40. When the needle valve 42 is opened, pressurized fuel is injected through the fuel injection holes 102.

The exemplary controller 34 is configured to modulate the opening/closing of the fuel injection valve 42 of the fuel injector 40 based on the sensor signals 46, 48 from the pressure sensor 50 and the valve position sensor 52. In the illustrated embodiment, the opening/closing of the fuel injection valve 42 is varied to inject fuel for each of the plurality of discrete fuel injections. In one example, the opening and closing of the fuel injection valve 42 is modulated for pilot fuel injections and the mail fuel injection. In one embodiment, the controller 34 modulates the fuel injection valve 42 such that the fuel injector valve 42 does not fully seat between the pilot injection events. In other words, an exterior tip of the fuel injection valve 42 does not contact an interior of the nozzle tip 104 between pilot injections. The exemplary non-seating fuel injection technique reduces wear on the valve 42 and tip 104 as well as minimizes fuel pressure pulsations in the fuel injector 40 that are caused by the full opening and closing of the fuel injection valve 42.

The velocity of the fuel exiting the nozzle tip 104 is a function of the fuel pressure in the injector 40. When the needle valve 42 begins to close, the fuel pressure in the injector 40 is decreased thereby reducing the velocity of the fuel exiting the holes 102. Air-fuel mixing is augmented at transients from higher to lower velocity leading to enhanced homogenous combustion and lower exhaust emissions.

Figure 6:
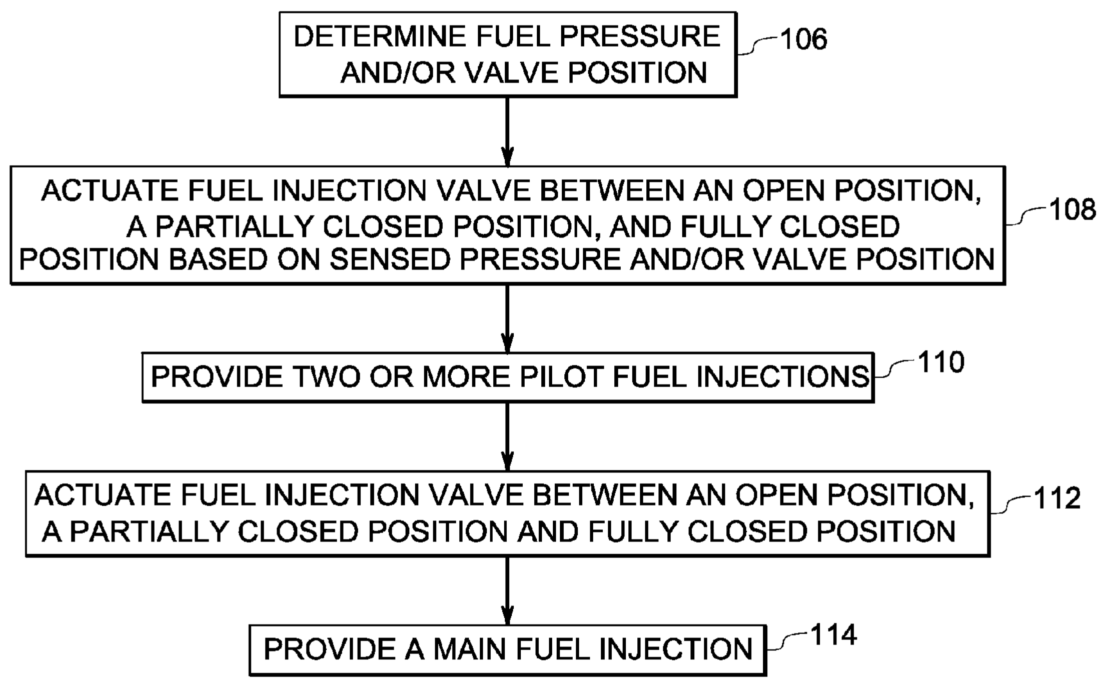
FIG. 6 is a flow chart illustrating a process of controlling a fuel injector within a turbocharged engine in accordance with an exemplary embodiment of the present technique.

Referring to FIG. 6, this figure illustrates one embodiment of the steps involved in controlling the fuel injector 40 within the turbocharged engine 16. In the illustrated embodiment, the pressure sensor 50 detects fuel pressure in the fuel injector 40 and the position sensor 52 detects position of the fuel injection valve 42 as represented by the step 106. The controller receives the fuel pressure signal 46 and position signal 48 from the pressure sensor 50 and the position sensor 52 respectively. The controller 34 modulates the fuel injection valve 42 of the fuel injector 40 to provide a plurality of discrete commanded fuel injections into the engine cylinder 26. In the illustrated embodiment, the amount of opening/closing of the fuel injection valve 42 is varied to inject fuel for each of the plurality of discrete fuel injections.

In the illustrated embodiment, the controller 34 actuates the fuel injection valve 42 between a fully closed, an open position and a partially closed position based on the sensor signals from the pressure sensor 50 and the valve position sensor 52 as represented by the step 108. Two or more pilot fuel injections are provided in the engine cylinder 26 as the piston 54 approaches the top dead center of in the engine cylinder 26 as represented by the step 110. In one embodiment, two or more generally equal quantity pilot fuel injections may be provided in the engine cylinder 26 as a piston 54 approaches top dead center in the engine cylinder 26. In another embodiment, two or more pilot fuel injections of unequal quantities may be provided in the engine cylinder 26. In one embodiment, the controller 34 modulates the fuel injection valve 42 such that the fuel injection valve 42 does not fully seat between the pilot injection events. During pilot fuel injections, the fuel injection valve 42 is actuated at a first time to open the valve to inject a first pilot fuel quantity. The valve 42 is then moved from an open position towards a closed position. The valve 42 is then actuated a second time to inject a second pilot fuel quantity before the fuel injection valve 42 reaches the closed position.

In the illustrated embodiment, the controller 34 further actuates the fuel injection valve 42 between a fully closed, an open position and a partially closed position as represented by the step 112. A main fuel injection is provided in the engine cylinder 26 after the pilot injections when the piston 54 is in the vicinity of the top dead center position of the compression stroke as represented by the step 114. In certain embodiments, the steps 108 and 112 of actuating the fuel injection valve 42 between a fully closed, an open position and a partially closed position occur between each successive injection into a particular cylinder 26 during a compression stroke of the piston 54 in the respective cylinder 26. These successive injections may include equal or unequal quantities of fuel, equal or unequal temporal spacing, equal or unequal velocities, and so forth.

Figure 7:
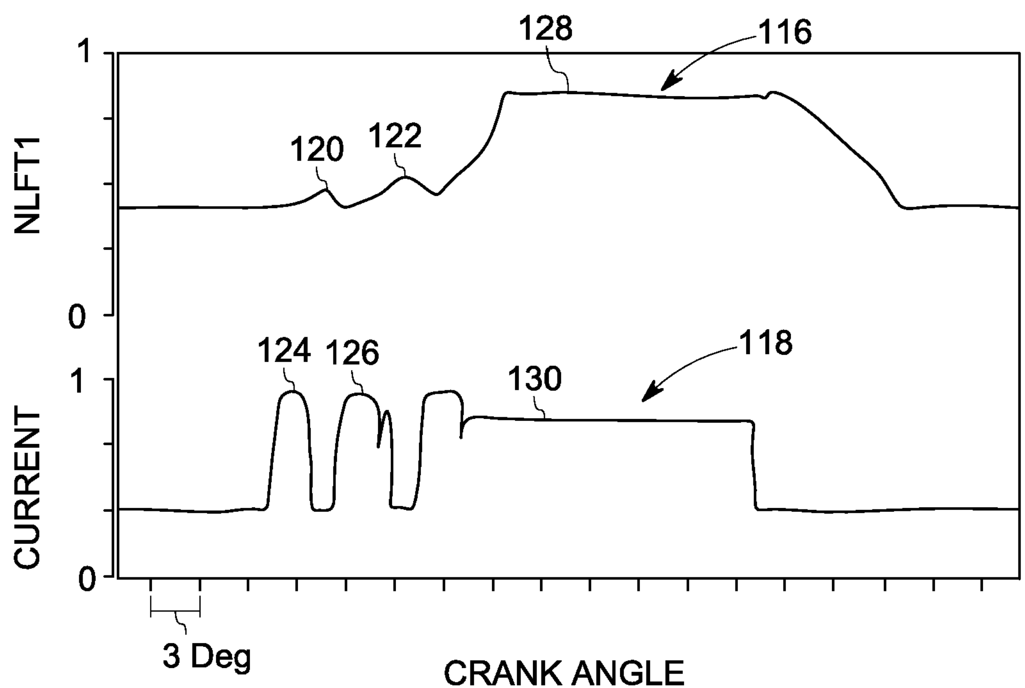
FIG. 7 is a graph illustrating variation of current and valve lift with respect to crank angle of a compression-ignition engine in accordance with an exemplary embodiment of the present technique.

Referring to FIG. 7, this figure illustrates a graph illustrating variation of current (in amperes) expressed in normalized units and valve lift (NLFT1) (in millimeters) expressed in normalized units (represented by Y-axis) with respect to crank angle (in degrees) expressed in normalized units (represented by X-axis) of a compression-ignition engine in accordance with an exemplary embodiment of the present technique. In the illustrated embodiment, a signal representative of the lift of the needle valve 42 is represented by the curve 116 and a signal representative of injector command from the controller 34 is represented by the curve 118. The controller 34 actuates the fuel injection valve 42 between a fully closed, an open position and a partially closed position to provide two pilot injections as represented by the smaller curves 120, 122 as the piston 54 approaches the top dead center of the engine cylinder 54. Two smaller curves 124, 126 of the injector command signal corresponds to the pilot injections 120, 122. The fuel injection valve 42 is moved initially from a closed position to an open position to inject the first pilot quantity 120 at a predetermined crank angle. The injection valve 42 is then moved from the open position towards a closed position. Before reaching the fully closed position, the valve 42 is again actuated to the open position to inject the second pilot quantity. The fuel injection valve 42 is again moved from the open position towards a closed position. Before reaching the fully closed position, the valve 42 is again actuated to the open position to inject the main fuel quantity as represented by the bigger curve 128. A bigger curve 130 of the injector command signal corresponds to the main injection 128.

Referring to FIG. 8, this figure illustrates a graph illustrating variation of current (in amperes) expressed in normalized units and valve lift (NLFT1) (in millimeters) expressed in normalized units (represented by Y-axis) with respect to crank angle (in degrees) expressed in normalized units (represented by X-axis) of a compression-ignition engine in accordance with an exemplary embodiment of the present technique. In the illustrated embodiment, a signal representative of the lift of the needle valve 42 is represented by the curve 132 and a signal representative of injector command from the controller 34 is represented by the curve 134. The controller 34 actuates the fuel injection valve 42 between a fully closed, an open position and a partially closed position to provide one pilot injection as represented by the smaller curve 136 as the piston 54 approaches the top dead center of the engine cylinder 26. Smaller curve 138 of the injector command signal corresponds to the pilot injection 136. The fuel injection valve 42 is moved initially from a closed position to an open position to inject the pilot quantity 136 at a predetermined crank angle. The injection valve 42 is then moved from the open position towards a closed position. Before reaching the fully closed position, the valve 42 is again actuated to the open position to inject the main fuel quantity as represented by the bigger curve 140. A bigger curve 142 of the injector command signal corresponds to the main injection 140.

Referring to FIG. 9, this figure illustrates variation of brake NOx (BNOx) emission (in grams per horsepower-hour) expressed in normalized units (represented by Y-axis) with respect to specific fuel consumption (SFC) (in pounds per horsepower-hour) expressed in normalized units (represented by X-axis) of a compression-ignition engine employing a multiple fuel injection strategy in accordance with an exemplary embodiment of the present technique. Curves 144, 146, 148 are representative of injections involving single injection strategy. Curves 150, 152, 154, 156 are representative of injections involving dual pilot injection strategies (i.e. two pilot injections).

For a single shot fuel injection, if the fuel injection timing is advanced, the specific fuel consumption is reduced and the exhaust gas emission is increased. In accordance with the present technique, the fuel injection is split into the pilot fuel injections and the main fuel injection as the piston 54 is in the vicinity of the top dead center in the cylinder 26. Atomization of fuel is enhanced due to split injection and may be further promoted by increasing the injection pressure of the fuel. The fuel is uniformly distributed in the combustion chamber and the air utilization within the combustion chamber is enhanced. Smaller quantity of pilot injection facilitates prevention of adherence of fuel to cylinder walls. As a result, the exhaust gas emission is substantially controlled and the specific fuel consumption is reduced. In the exemplary technique, the controller 34 actuates the fuel injection valve 42 of the fuel injector 40 between an open position and a partially closed position during each fuel injection into the engine cylinder 26. This facilitates slower initial injection rate for enhanced burning of air-fuel mixture, variable fuel injection pressure and velocity for enhanced air-fuel mixing, and reduced injector 40 wear as indicated by curves 150, 152, 154, 156.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A vehicle, comprising:

an engine comprising a piston disposed in a cylinder and a fuel injector coupled to the engine, wherein the fuel injector comprises an injection opening configured to vary in cross-section between open and closed states, and the fuel injector is configured to modulate the cross-section of the injection opening to generate a plurality of discrete fuel injections without completely closing the injection opening from one injection to another of the plurality of discrete fuel injections.

2. The vehicle of claim 1, wherein the engine comprises a diesel engine, the vehicle comprises a locomotive, and a turbocharger is coupled to the engine.

3. The vehicle of claim 1, wherein the fuel injector is configured to modulate the cross-section of the injection opening to generate at least two or more equal quantity fuel injections without completely closing the injection opening between the equal quantity fuel injections.

4. The vehicle of claim 1, wherein the fuel injector is configured to modulate the cross-section of the injection opening to generate at least two or more unequal fuel injections without completely closing the injection opening between the unequal fuel injections, wherein the unequal fuel injections include a main fuel injection after two or more pilot fuel injections, and the main fuel injection comprises a fuel quantity substantially larger than each of the two or more pilot fuel injections.

5. A fuel injector configured to provide a plurality of fuel injections into an engine cylinder, the fuel injector comprising:

a fuel injection housing;

a fuel injection valve disposed in the fuel injection housing; and a controller coupled to the fuel injection valve, wherein the controller is configured to modulate the fuel injection valve between open and closed positions to generate a plurality of discrete fuel injections without completely closing the fuel injection valve from one injection to another of the plurality of discrete fuel injections.

6. The fuel injector of claim 5, wherein the controller is configured to modulate the fuel injection valve to generate at least two or more equal quantity fuel injections without completely closing the fuel injection valve between the equal quantity fuel injections.

7. The fuel injector of claim 6, wherein the controller is configured to modulate the fuel injection valve to generate at least two or more unequal fuel injections without completely closing the fuel injection valve between the unequal fuel injections, wherein the unequal fuel injections include a main fuel injection after two or more pilot fuel injections, and the main fuel injection comprises a fuel quantity substantially larger than each of the two or more pilot fuel injections.

8. The fuel injector of claim 5, comprising a pressure sensor and a position sensor coupled to the controller and configured to detect feedback including a fuel pressure and a fuel injection valve position, respectively, wherein the controller modulates the fuel injection valve without completely closing the fuel injection valve from one injection to another based at least partially on the feedback.

9. A system, comprising:

a controller configured to control a fuel injector to provide a plurality of fuel injections into an engine cylinder, wherein the controller is configured to modulate a fuel injection valve of the fuel injector between open and closed positions without completely closing the fuel injection valve from one injection to another of the plurality of fuel injections.

10. The system of claim 9, wherein the controller is configured to modulate the fuel injection valve to generate at least two or more equal quantity fuel injections without completely closing the fuel injection valve between the equal quantity fuel injections.

11. The system of claim 10, wherein the controller is configured to modulate the fuel injection valve to generate at least two or more unequal fuel injections without completely closing the fuel injection valve between the unequal fuel injections.

12. The system of claim 9, comprising a pressure sensor and a position sensor coupled to the controller and configured to detect feedback including a fuel pressure and a fuel injection valve position, respectively, wherein the controller modulates the fuel injection valve without completely closing the fuel injection valve from one injection to another based at least partially on the feedback.

13. The system of claim 9, comprising a compression ignition engine having the controller.

14. The system of claim 13, comprising a vehicle having the compression ignition engine and the controller.

15. A non-transitory tangible medium comprising a computer program, comprising:

programming instructions disposed on the non-transitory tangible medium, wherein the programming instructions include instructions to provide a plurality of fuel injections into an engine cylinder via a modulation of a valve of a fuel injector, wherein the modulation comprises movement of the valve between open and closed positions without completely closing the valve from one injection to another of the plurality of fuel injections.

16. A method, comprising:

providing a modulated fuel injection to an engine cylinder by modulating a valve of a fuel injector, wherein modulating the valve comprises moving the valve between open and closed positions without completely closing the valve to generate a plurality of discrete fuel injections.

17. The method of claim 16, wherein modulating the valve comprises moving the valve to generate two or more unequal fuel injections without completely closing the valve between the unequal fuel injections.

18. The method of claim 16, wherein modulating the valve comprises moving the valve to generate two or more generally equal quantity fuel injections without completely closing the valve between the generally equal quantity fuel injections.

19. The method of claim 16, wherein modulating the valve comprises moving the valve to generate a main fuel injection after two or more pilot fuel injections without completely closing the valve between the main fuel injection and the pilot fuel injections, and the main fuel injection comprises a fuel quantity substantially larger than each of the two or more pilot fuel injections.

20. The method of claim 16, wherein modulating the valve of the fuel injector without completely closing the valve comprises reducing wear of the valve, the fuel injector, or a combination thereof.

21. The method of claim 16 wherein modulating the valve comprises actuating the valve at a first time to open the valve to inject a first fuel quantity, waiting for the valve to move from an open position toward a closed position without allowing the valve to reach the closed position, and actuating the valve at a second time to open the valve to inject a second fuel quantity before the valve reaches the closed position.

22. The method of claim 16, wherein modulating the valve comprises varying an opening to pass fuel for each of the plurality of discrete fuel injections without completely closing the opening between the plurality of discrete fuel injections.

23. The method of claim 16, comprising actuating the valve between a fully closed, an open position and a partially closed position during each fuel injection into the engine cylinder based on a fuel pressure, a position of the valve, or a combination thereof.

24. The method of claim 16, comprising reducing an initial fuel injection rate into the engine cylinder by actuating the valve between a normally closed, an open position and a partially closed position during each fuel injection into the engine cylinder.

25. The method of claim 16, comprising adjusting fuel injection rate by actuating the valve between a fully closed, an open position and a partially closed position during each fuel injection into the engine cylinder.

* * * * *